US008518177B2

(12) United States Patent
Chattopadhyay et al.

(10) Patent No.: US 8,518,177 B2
(45) Date of Patent: Aug. 27, 2013

(54) MATERIALS AND METHODS FOR THE PRODUCTION OF GREEN CONCRETE

(75) Inventors: Brajadulal Chattopadhyay, Kolkata (IN); Saroj Mandal, Kolkata (IN)

(73) Assignee: Jadavpur University, West Bengal, Kolkata, West Bengal (IN)

( * ) Notice: Subject to any disclaimer, the term of this patent is extended or adjusted under 35 U.S.C. 154(b) by 240 days.

(21) Appl. No.: 12/962,174

(22) Filed: Dec. 7, 2010

(65) Prior Publication Data
US 2012/0137931 A1 Jun. 7, 2012

(51) Int. Cl.
*C04B 24/00* (2006.01)
(52) U.S. Cl.
USPC .......................... 106/724; 106/738
(58) Field of Classification Search
USPC ................................. 106/724, 738
See application file for complete search history.

(56) References Cited

U.S. PATENT DOCUMENTS

| | | | |
|---|---|---|---|
| 4,049,465 A | 9/1977 | Dwyer | |
| 4,383,862 A * | 5/1983 | Dyson | 106/646 |
| 4,836,855 A | 6/1989 | Calliau et al. | |
| 6,764,543 B2 | 7/2004 | Greenwood et al. | |
| 6,989,266 B2 | 1/2006 | Koga et al. | |
| 7,229,807 B2 | 6/2007 | Muller et al. | |

FOREIGN PATENT DOCUMENTS

| | | |
|---|---|---|
| WO | WO 2005/0026269 | 3/2005 |
| WO | WO 2007/0026352 | 8/2007 |
| WO | WO 2009/156740 | 12/2009 |

OTHER PUBLICATIONS

U.S. Appl. No. 12/648,297, filed Dec. 28, 2009, Chattopadhyay.
"Using bacteria to self heal cracks in concrete," Apr. 23, 2010, http://www.aggregateresearch.com/article.aspx?ID=19043, http://www.todaysconcretetechnology.com/using-bacteria-to-self-heal-cracks-in-concrete.html, 1 page.
Altschul, S.F. et al., "Gapped BLAST and PSI-BLAST: a new generation of protein database search programs," Nucleic Acids Res., 1997, vol. 25, No. 7, pp. 3389-3402.
Biswas, M. et al., "Bioremediase a unique protein from a novel bacterium BKH1, ushering a new hope in concrete technology," Enzyme and Microbial Technology, 2010, vol. 46, pp. 581-587.
Boskey, A.L., "Biomineralization: An Overview," Connect. Tissue Res., 2003, vol. 44, pp. 5-9.
Felsenstein, J., "Confidence limits on Phylogenies: An approach using the bootstrap," Evolution, 1985, vol. 39, pp. 783-791.
Ghosh, P. et al., "Development of bioconcrete material using an enrichment culture of novel thermophilic anaerobic bacteria," Indian Journal of Experimental Biology, 2006, vol. 44, pp. 336-339.
Ghosh, P. et al., "Use of Microorganism to Improve the Strength of Cement Mortar," Cement and Concrete Research, 2005, vol. 35, pp. 1980-1983.
Ghosh, S. et al., "Microbial activity on the microstructure of bacteria modified mortar," Cement & Concrete Composites, vol. 31, 2009, pp. 93-98.
Heinen, W. et al., "Leaching of silica and uranium and other quantitative aspects of the lithobiontic colonization in a radioactive thermal spring," Microbial Ecology, 1988, vol. 15, pp. 135-149.

(Continued)

*Primary Examiner* — Paul Marcantoni
(74) *Attorney, Agent, or Firm* — Foley & Lardner LLP (57) ABSTRACT

Concrete mixtures containing a biological catalyst with silica leaching activity are generally described. In an example, in the presence of the biological catalyst a high strength, environmentally friendly, sustainable concrete mixture is produced. Further, described herein are methods for producing the concrete mixtures.

20 Claims, 4 Drawing Sheets

(56) References Cited

OTHER PUBLICATIONS

Inagaki, F. et al., "Microbial silica deposition in geothermal hot waters," Appl. Microbiol Biotechnol., 2003, vol. 60, pp. 605-611.
Lowry, O.H. et al., "Protein measurement with the folin phenol reagent," J. Biol. Chem., 1951, vol. 193, pp. 265-275.
Rodriguez-Navarro, C. et al., "Conservation of Ornamental Stone by Myxococcus xanthus-Induced Carbonate Biomineralization," Appl. and Environ. Microbiol., 2003, vol. 69, No. 4, pp. 2182-2193.
Roose-Amsaleg, C.L. et al., "Extraction and purification of microbial DNA from soil and sediment samples," Appl. Soil Ecol., 2001, vol. 18, pp. 47-60.
Saitou, N. et al., "The Neighbor-joining Method: A New Method for Reconstructing Phylogenetic Trees," Mol. Biol. Evol., 1987, vol. 4, pp. 406-425.
Bapat, J.D., Dr., "Bacterial Concrete: Biomineralisation," Cement and construction developments, Feb. 13, 2009, pp. 2.
Bradley D., "TR10: Green Concrete," Storing carbon dioxide in cement, Technology Review, May/Jun. 2010, 2 pages.
Groudev, S.N., "Use of heterotrophic microorganisms in mineral biotechnology" Acta Biotechnologica, 2004, vol. 7, pp. 299-306.
Atschul, S.F., et al., "Basic local alignment search tool," J. Mol. Biol, 1990, vol. 215, pp. 403-410.
Adamson, D.H., et al., "Non-peptide, silicatein alpha inspired silica condensation catalyst", Polymeric Materials: Science and Engineering Preprints, (2004), vol. 90, pp. 239-241, presented at 227th ACS National Meeting, Anaheim, CA, Mar. 28-Apr. 1, 2004, American Chemical Society.
Roose-Amsaleg, C.L., et al., "Extraction and purification of microbial DNA from soil and sediment samples," 2001, Appl. Soil Ecol, vol. 18, Issue 1, pp. 47-60.
ASTM Standard C597-02, "Standard test method for pulse velocity through concrete", (2002), ASTM International, 4 pages.
Bang, et al., "Calcite Precipitation Induced by Polyurethane-Immobilized Bacillus pasteurii", Enzyme and Microbial Technology, (2001), vol. 28, No. 4-5, pp. 404-409, Elsevier.
Belkova, L.N., "Biomineralization in Natural Environments: The Effect of Microorganisms Inhabiting Hot Spring Water and Biomats on Mineral Formation" Geophysical Research Abstracts, (2005), vol. 7, Abstract 03264, 2 pages, presented at the European Geosciences Union General Sciences Assembly, Vienna, Austria, Apr. 24-29, 2005.
Portland Cement Association, "Cement & Concrete Basics: Aggregate," 2013 retrieved from http://www.cement.org/basics/concretebasics_aggregate.asp, 2 pages.
Carillo, H., and Lipman, D., The multiple sequence alignment problem in biology, SIAM J. applied Math., 1988, vol. 48, Issue 5, pp. 1073-1082.
Cha, J. N. et al., "Silicatein Filaments and Subunits from a Marine Sponge Direct the Polymerization of Silica and Silicones In Vitro," Proc. Natl. Acad. Sci. USA, 1999, vol. 96, Issue 2, pp. 361-365.
Chattopadhyay, B.D. et al., "Effect of calcium ion on Methanosarcina barkeri MS", Indian Journal of Experimental Biology, (1993), vol. 31, pp. 738-742, National Institute of Science Communication and Information Resources, CSIR.
Day, J. L. et al., "Microbiologically Induced Sealant for Concrete Crack Remediation," 5 pages, Jun. 25, 2004, Retrieved from the Internet [http://earthenhand.wikispaces.com/*Bacterial+Cement].
Dayhoff., et al., "Atlas of Protein Sequence and Structure," National Biomedical Research Foundation, Washington, DC, 1978, vol. 5, supp. 3, pp. 73-93.
De Graef, et al., "Cleaning of Concrete Fouled by Lichens with the Aid of Thiobacilli", Materials and Structures, (2005), vol. 38, No. 10, pp. 875-882, Springer Verlag.
Devereux, J., et al., A comprehensive set of sequence analysis programs for the VAX, Nucleic Acids Research, 1984, vol. 12, Issue 1, pp. 387-395.
Dick, et al., "Bio-deposition of a Calcium Carbonate Layer on Degraded Limestone by Bacillus species", Biodegradation, (2006), vol. 17, No. 4, pp. 357-367, Springer Verlag.
Edvardsen, C., "Water Permeability and Autogenous Healing of Cracks in Concrete," ACI Materials Journal, vol. 96, No. 4, pp. 448-455, 1999.
Gascuel, O and Steel, M., "Neighbor-joining revealed," Mol Biol Evol, 2006, vol. 23, Issue 11, pp. 1997-2000.
Ghosh, et al., "Use of Hot Spring Bacteria for Remediation of Cracks and Increment of Durability of Structures" The Indian Concrete Journal, (Sep. 2008), pp. 11-16, ACC Ltd.
Ghosh, P., S. Mandal, and B. D. Chattopadhyay., "Effect of addition of microorganism on the strength of concrete," The Ind. Concr. J., 2006, pp. 45-48.
Henikoff, S and Henikoff, J.G., "Amino acid substitution matrices from protein blocks," Proc. Natl. Acad. Sci. USA, 1992, vol. 89, pp. 10915-10919.
International Search Report and Written Opinion for PCT/IB2010/002788 mailed Feb. 24, 2011.
GenBank Accession No. 11376303, Nov. 2, 2006, 2 pages.
GenBank Accession No. 45069099, Mar. 4, 2004, 2 pages.
IS 650, "Indian Standard: Standard Sand for Testing Cement—Specification", Second Revision, Bureau of Indian Standards (BIS), New Delhi, India, 1991, 8 pages.
IS 8112, "Indian Standard: 43 Grade Ordinary Portland Cement—Specification", Bureau of Indian Standards (BIS), New Delhi, India, 1989, 22 pages.
Jasiczak, J. and Zielinski, K., "Effect of protein additive on properties of mortar," Cement and Concrete Composites, vol. 28, Issue 5, pp. 451-457, May 2006.
Jonkers H.M., "Self Healing Concrete: a Biological Approach", Self Healing Materials: An Alternative Approach to 20 Centuries of Material Science, Ed. S. van der Zwaag, Springer Verlag, 2007, pp. 195-204, Print.
Kessler, M.K., et al., "Self-Healing Structural Composite Material," Compos Part A. Applied Science and Manufacturing, 2003, vol. 34, Issue 8, pp. 743-753.
Kimura, M., "A simple method for estimating evolutionary rates of base substitutions through comparative studies of nucleotide sequences", Journal of Molecular Evolution, (1980), vol. 16, No. 2, pp. 111-120, Springer Verlag.
Needleman, S.B and Wunsch, C.D, "A general method applicable to the search for similarities in the amino acid sequence of two proteins," J. Mol. Biol,1970, vol. 48, Issue 3, pp. 443-453.
Navarro, C.R., et al., "Conservation of Ornamental Stone by Myxococcus xanthus—Induced Carbonate Biomineralization," Appl. Environ. Microbiol, 2003, vol. 69, Issue 4, pp. 2182-2193.
Ramchandran, et al., "Remediation of Concrete Using Microorganisms" ACI Materials Journal, (2001), vol. 98, No. 1, pp. 3-9, American Concrete Institute.
Schroder, et al., "Silicase, an enzyme which degrades biogenous amorphous silica: contribution to the metabolism of silica deposition in the demosponge Suberites domuncula", Silicon Biomineralization: Biology, Biochemistry, Molecular Biology, Biotechnology, Ed. W.E.G. Muller, Springer-Verlag, 2003, pp. 249-268.
Skinner, et al., "Biomineralization", Treatise on Geochemistry, vol. 8: Biogeochemistry, 2007, pp. 1-69, Elsevier.
Studier, J.A., and Keppler, K.J., A note on the neighbor-joining algorithm of saitou and nei, Mol Biol Evol, 1988, vol. 5, Issue 6, pp. 729-731.
Vrieling, et al., "Controlled Silica Synthesis Inspired by Diatom Silicon Biomineralization", Journal of Nanoscience and Nanotechnology, (2005), vol. 5, No. 1, pp. 68-78, American Scientific Publishers.
Weiner, et al., "An Overview of Biomineralization Processes and the Problem of the Vital Effect", Reviews in Mineralogy and Geochemistry, (2003), vol. 54, No. 1, pp. 1-29, Mineralogical Society of America.
Wig, et al., "Comparative Tests of the Strength of Concrete in the Laboratory and the Field" Proceedings of the Eighth Annual Convention, National Association of Cement Users, (1912), vol. 8, pp. 522-525.
White, S.R., et al., "Autonomic Healing of Polymer Composites," Nature, 2001, vol. 409, pp. 794-797.

* cited by examiner

SEQUENCE LISTING

```
<160> NUMBER OF SEQ ID NOS: 2

<210> SEQ ID NO 1
<211> LENGTH: 25
<212> TYPE: PRT
<213> ORGANISM: Artificial Sequence
<220> FEATURE:
<223> OTHER INFORMATION: Synthetic peptide

<400> SEQUENCE: 1

Asp Phe Pro Ile Ala Asn Gly Glu Arg Gln Ser Pro Val Asp Ile Asp
1               5                   10                  15

Thr Lys Ala Val Val Gln Asp Pro Ala
            20                  25

<210> SEQ ID NO 2
<211> LENGTH: 697
<212> TYPE: DNA
<213> ORGANISM: Thermoanaerobacter sp.

<400> SEQUENCE: 2
ggtaagcacg gagttgagtg ccggatagcg gcggacgggg tgagtaaacg cgtgggcaaa      60
cctaccctta agaccgggga taacacctcg aaaggggtgc taatactgga taagctcctt     120
gtagggcatc ctatgaggag ggaaggtagc ggaagctacc gcttaaggat gggcccgcgt     180
cccatcagct agttggtagg gtaacggcct accaaggcga cgacgggtag ccggcctgag     240
agggtggtgg gccacactgg gactgagaca cggcccagac tcctacggga ggcagcagtg     300
gggaatcttg cgcaatgggc gaaagcctga cgcagcgacg ccgcgtgagc gaagaaggcc     360
ttcgggtcgt aaagctcgat agtgtgggaa gaatagatga cggtaccaca cgaaagcccc     420
ggctaactac gtgccagcag ccgcggtaag acgtagggg cgagcgttgt ccggaattac     480
```

```
tgggcgtaaa gggcgcgtag gcggccactt aagtcaggtg taaaaaaccc gggctcaacc       540
cgggggatgc acatgaaact gggtggctag aggggaggag aggggagtgg aattcccggt       600
gtagcggtga aatgcgtaga tatcgggagg aataccagtg gcgaaggcga ctctctggac       660
tgaccctgac gctgaggcgc gaaagcgtgg ggagcaa                                697
```

MATERIALS AND METHODS FOR THE PRODUCTION OF GREEN CONCRETE

TECHNICAL FIELD

This disclosure relates generally to the production of concrete compounds, and to cements containing biomolecules with silica releasing activity. Also included are methods for producing the concrete and cement compounds.

BACKGROUND

The following description is provided to assist the understanding of the reader. None of the information provided or references cited is admitted to be prior art.

Concrete is the most widely used construction material in the world. However, due to the heterogeneity and composite nature of concrete, its final composition can vary. Concrete typically has a high compressive strength. The tensile strength of concrete, however, is relatively low. The lack of tensile strength can be compensated for by using reinforcements, e.g., steel rebar, which can increase its resilience. However, even when concrete is reinforced, it can still crack as a result of applied structural loading, shrinking, and thermal deformations. Consequently, concrete maintenance is virtually unavoidable.

Cement is an essential element of concrete. Ordinary Portland Cement (OPC) is presently the most common type of cement. In addition to concrete, OPC is an element of mortar and non-specialty grouts. OPC consists of approximately 90% Portland cement clinker, up to 5% gypsum, and up to 5% of other minor constituents. When OPC is reacted with water, a hydrolysis reaction occurs and the cement constituents form a solid calcium silicate hydrate (C—S—H) gel. However, the manufacture of OPC in an energy intensive process that involves heating high volumes of raw materials to approximately 1400° C. Accordingly, carbon dioxide ($CO_2$) is generated from burning fossil fuels to reach these temperatures. Moreover, one of the basic raw materials used in producing OPC is calcium carbonate ($CaCO_3$), i.e., limestone. Limestone decomposes to form calcium oxide (CaO), which, in turn, releases additional geologically sequestered $CO_2$. $CO_2$ emissions likely contribute to an increase in the atmospheric and surface temperatures of the Earth. Such temperature increases are predicted to have serious environmental consequences.

SUMMARY

In one aspect, the present disclosure generally describes a concrete composition including one or more bacteria or proteins capable of catalyzing a biosilification reaction and one or more magnesium silicate compounds. In one embodiment, the concrete composition further comprises one or more additional silicate compounds. In one embodiment, the one or more additional silicate compounds is calcium silicate, aluminum silicate, potassium silicate, sodium silicate, lithium silicate, or any combination thereof.

In one embodiment, the concrete composition includes cementitious materials, sand, and gravel, or any combination thereof. In one embodiment, one or more bacteria are added to the concrete in an amount from about $10^1$ to about $10^9$ cells/vol of water used in concrete. In one embodiment, one or more proteins are added to the concrete in an amount from about 0.1 to about 3 μg protein/g cement. In one embodiment, the magnesium silicate compound is $MgSiO_3$. In one embodiment, the magnesium silicate compound is soft-burned $MgSiO_3$.

In one aspect, the biosilification reaction releases silica from a magnesium substrate. In one embodiment, $MgSiO_3$ is a substrate for the biosilification reaction. In one embodiment, the bacteria is a thermophilic bacteria. In one embodiment, the bacteria is a *Thermoanaerobacter* sp. bacteria. In one embodiment, the bacteria is BKH1. In one embodiment, the one or more proteins has carbonic anhydrase activity.

In one embodiment, the one or more proteins has at least 90% sequence identity to SEQ ID NO.: 1. In one embodiment, the one or more cementitious materials includes cement powder, fine aggregates, and coarse aggregates, or any combination thereof. In one embodiment, the composition has increased compressive, flexural, and/or tensile strength compared to the composition without the one or more bacteria or proteins. In one embodiment, the increased compressive, flexural, and/or tensile strength is at least about a 20% increase.

In one embodiment, the composition has a decreased water absorption from about 5 to about 10% compared to the composition without the one or more bacteria or proteins. In one embodiment, the composition further includes reducing agents, fluidizing agents, rust-proofing agents, hardening agents, hardening-accelerator agents, setting retarders, inflating agents, fly ash, slag, silica fume, rice husk ash, and/or clinkers.

In one aspect, the present disclosure generally describes a method for producing biomineralized concrete including combining one or more cementitious materials, one or more bacteria or proteins capable of catalyzing a biosilification reaction, and one or more magnesium silicate compounds, into a mixture; and allowing the mixture to cure into a solid product. In one embodiment, the product is formed by air curing or water curing or a combination of both.

In one embodiment, the air curing or the water curing occur for about 1 to about 60 days. In one embodiment the combining occurs at a temperature from about 10° C. to about 80° C. In one embodiment, the combining occurs at a pH from about 4 to about 12. In one embodiment, the method further includes adding one or more additional silicate compounds to the mixture. In one embodiment of the method, the one or more additional silicate compounds is calcium silicate, aluminum silicate, potassium silicate, sodium silicate, lithium silicate, or any combination thereof.

In one embodiment of the method, the one or more magnesium silicate compounds is $MgSiO_3$ or soft-burned $MgSiO_3$. In one embodiment of the method, the $MgSiO_3$ is a substrate for the biosilification reaction. In one embodiment of the method, the bacteria is thermophilic. In one embodiment of the method, the bacteria is a *Thermoanaerobacter* sp. bacteria. In one embodiment of the method, the bacteria is BKH1. In one embodiment of the method, the one or more proteins is a protein with carbonic anhydrase activity.

In one embodiment of the method, the one or more proteins has at least about 90% sequence identity to SEQ ID NO. 1. In one embodiment of the method, the one or more cementitious materials includes cement powder, fine aggregates, coarse aggregates, or any combination thereof. In one embodiment of the method, the biomineralized concrete has increased compressive, flexural, and/or tensile strength compared to the one or more cementitious materials and the one or more magnesium silicate compounds alone.

In one embodiment of the method, the increased compressive, flexural, and/or tensile strength is at least about a 20% increase. In one embodiment of the method, the biomineralized concrete has decreased water absorption of from about 5% to about 10% compared to the one or more cementitious materials and the one or more magnesium silicate compounds alone.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 1A-C show a scanning electron micrograph (SEM) image and graphs characterizing the bacterial strain BKH1. FIG. 1A is a SEM image of BKH1 at 10,000×.

FIGS. 3A-B are graphs showing the results of silica release activity (biosilification) assays using TOES as a substrate.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure relates generally to an isolated anaerobic bacteria, a protein purified from the bacteria, concrete compositions containing a magnesium silicate compound, and methods related thereto. In one aspect, a biomineralized concrete is prepared from one or more of a cement, a bacteria or protein capable of catalyzing a biosilification assay, and a magnesium silicate ($MgSiO_3$) compound.

Typically, the primary components of a concrete composition, i.e., cement, matrix are calcium hydrate silicate (C—S—H), calcium hydrate (CH), capillary pores, and anhydrous cement particles. The CSH is a gel like substance which imparts the strength of concrete. CSH is formed by the reaction of water with cement particles at various stages of the production process. In conventional concrete, greater than 25% of the cement particles are not hydrated. Accordingly, by increasing the amount of water in the unreacted cement particles, additional C—S—H and/or other composites, e.g., Gehlenite, can be formed, which will increase the strength and/or resilience of the cement. See, e.g., Ghosh et al., *Use of Microorganisms to Improve the Strength of Cement-Mortar. Cem. Concr. Res.* 35, 1980-83 (2005).

In one aspect, the present disclosure provides for an economically- and environmentally-friendly, self-healing, bioconcrete composition. In one embodiment, BKH1 bacteria isolated from hot springs at Brakreshwar, India are combined with a cement matrix, to confer increased strength and self-healing properties to concrete. A protein with biosilification activity may be purified from BKH1. Without intending to be limited by theory, the representative protein (referred to herein as "bioremediase") produces a concrete with increased strength and self-healing properties by increasing the percentage of hydrated cement particles in the concrete composition without increasing the original water concentration.

In one embodiment, the cement is produced in the presence of BKH1, bioremediase, or both. In one embodiment, BKH1 and/or bioremediase reacts with $MgSiO_3$, thereby forming a cementitious structure with increased silica concentrations compared to a cementitious structure that is formed in the absence of one or both of BKH1 and bioremediase. In one embodiment, the cement is capable of absorbing $CO_2$. In one embodiment, the cement has at least about 0.1, 0.5, 1, 2, 3, 4, 5, 10, 15, 20, 25, 30 or 35% greater silica concentration compared to a cementitious structure that is formed in the absence of one or both of BKH1 and bioremediase.

The present compositions and methods provide several advantages over conventional concrete compositions, i.e., concrete compositions which do not contain BKH1 and/or bioremediase in the presence of a magnesium silicate compound. One of many advantages is that BKH1 may be produced at a minimum cost, and in minimal culture growth medium. Another advantage is that BKH1 and/or bioremediase are thermostable and maintain biosilification and biomineralization activity over a wide pH range, i.e., about 6 to about 13. BKH1 can be grown in aerobic or anaerobic conditions, and is capable of proliferation in anaerobic conditions.

In one aspect, the process for generating the cement, mortar, and/or concrete compositions is environmentally safe because pollutants (e.g., $CO_2$) that are typically associated with the manufacturing of concrete are decreased. Typically, net $CO_2$ emissions are decreased with a magnesium-based cement because less fossil fuel is required to produce the raw materials. In one embodiment, BKH1 and/or bioremediase is capable of stabilizing concrete, thereby decreasing the need for constant maintenance and repair.

Units, prefixes, and symbols may be denoted in their accepted SI form. Unless otherwise indicated, amino acid sequences are written left to right in amino to carboxy orientation. Amino acids may be referred to herein by either their commonly known three letter symbols or by the one-letter symbols recommended by the IUPAC-IUBMB Nomenclature Commission.

As used herein, unless otherwise stated, the singular forms "a," "an," and "the" include plural reference. Thus, for example, a reference to "a protein" includes a plurality of protein molecules.

As used herein, the term "about" will be understood by persons of ordinary skill in the art and will vary to some extent depending upon the context in which it is used. If there are uses of the term which are not clear to persons of ordinary skill in the art, given the context in which it is used, the term "about" in reference to quantitative values will mean up to plus or minus 10% of the enumerated value.

As used herein, the term "bioconcrete" refers to concrete that is formed by, inter alia, the process of biomineralization and/or biosilification.

As used herein, the term "biomineralization" refers to the ability of a biological organism or biomolecule, i.e., a bioremediase enzyme, to produce or catalyze the formation of minerals from a biological process. Biologically produced minerals include, but are not limited to, silicates, carbonates, calcium phosphates, etc. Biomineralization may also refer to the reinforcement of concrete structures though a biologically catalyzed reaction. In one embodiment, BKH1 and/or bioremediase are capable of catalyzing the formation of biomineralized concrete, i.e., bioconcrete.

As used herein, the term "bioremediase" or "bioremediase protein" refers to a protein purified from BKH1 that has biosilification and biomineralization activity. Bioremediase is an approximate 28 kDa protein. Protein variants and active bioremediase fragments are also included within the term "bioremediase." Variants include amino acid insertions, deletions, and substitutions, or combinations thereof, which retain a functional activity of the native bioremediase protein. Substitution variants comprise at least one amino acid residue in the native bioremediase sequence that is replaced with a different amino acid at the same position. Substitutions may be single, where only one amino acid in the molecule has been substituted, or they may be multiple substitutions where two or more amino acids have been substituted. Similarly, deletion variants comprise at least one amino acid residue in the native bioremediase sequence removed and not replaced.

As used herein, the term "biosilification" refers to the ability of a biological organism or biomolecule, i.e., a protein, to release or produce silicic acid from a substrate containing silica. In one embodiment, biosilification refers to the ability of a bacteria or proteins to release silicic acid from a substrate containing silica. In one embodiment, biosilification refers to the ability of a bacteria or proteins to release silicic acid from $MgSiO_3$. In one embodiment, BKH1 and bioremediase are capable of catalyzing a biosilification reaction.

As used herein, the term "BKH1" refers to a *Thermoanaerobacter* sp. anaerobic bacterial strain isolated from hot springs at Brakreshwar, India. BKH1 can be grown in a liquid semi-solid media with subculturing, e.g., approximately every 10-12 days, to maintain viability. In one embodiment, the addition of 10% glycerol (v/v) to the growth medium allows for culture maintenance for more than 6 months. BKH1 bacteria contain biomineralization and biosilification activity, and have a 697 nucleotide 16S ribosomal RNA sequence (GenBank Accession No: FJ177512.1).

As used herein, the term "cement matrix" or "cement" refers to a component of a concrete composition and may include a binder, i.e., a hydraulic cement. "Hydraulic cement" refers to any cement that will set and harden upon exposure to water, and includes, but is not limited to, Ordinary Portland Cement (OPC), blended Portland cement, e.g., Portland blastfurnace cement, Portland flyash cement, Portland pozzolan cement, Portland silica fume cement, etc., masonry cement, expansive cement, rapid setting and hardening cement, calcium aluminate cement, calcium sulfoaluminate cement, pozzolan-lime cement, slag-lime cement, supersulfated cement, natural cement, geopolymer cement, magnesium-based cement, magnesium silicate cement, magnesium phosphate cement, calcium silicate cement, aluminum silicate cement, potassium silicate cement, sodium silicate cement, lithium silicate cement, and any mixtures and combinations thereof.

As used herein, the term "concrete" refers to materials including cement, a cement matrix, or cement-like matrix, and other cementitious materials, e.g., pozzolans, aggregate, water, etc., that are typical of concretes, mortars, and other composite materials.

As used herein, the term "increase in strength" or "increased strength" refers to the ability of a concrete composition containing BKH1 and/or bioremediase, i.e., bioconcrete, to withstand compressive and/or tensile pressure. A measurable change in physical strength is typically measured relative to a similar concrete composition that does not have BKH1 and/or bioremediase. Relative strength can be measured by comparing the percentage difference (MPa) between two or more concrete samples. For example, a concrete composition that includes a representative bioremediase may have an "increased strength" of about 1, 5, 10, 20, 30, or 40% compared to a concrete composition in the absence of a representative bioremediase. In one embodiment, a manual pressure bench is employed to measure the compressive, flexural, and tensile strengths of the bioconcrete. In one embodiment, a micro-bench device is employed to measure the compressive, flexural, and tensile strengths of the bioconcrete. See, e.g., Biswas et al., *Bioremediase a unique protein from a novel bacterium BKH1, ushering a new hope in concrete technology. Enzyme and Microbial Technology*, Vol. 46 581-587 (2010).

As used herein, the term "physiological conditions" refers to temperature, pH, ionic strength, viscosity, and similar biochemical parameters which are compatible with an organism, and/or which typically exist intracellularly in an organism or cell.

The terms "polypeptide," "protein," and "peptide" are used herein interchangeably to refer to amino acid chains in which the amino acid residues are linked by peptide bonds or modified peptide bonds. The amino acid chains can be of any length of greater than two amino acids. Most proteins fold into unique three-dimensional structures. The shape into which a protein naturally folds is known as its native conformation. Although many proteins can fold unassisted, simply through the chemical properties of their amino acids, others require the aid of molecular chaperones to fold into their native states.

As used herein, a "purified" or "isolated" polypeptide or peptide is substantially free of cellular material or other contaminating polypeptides from the cell or tissue source from which the agent is derived, or substantially free from chemical precursors or other chemicals when chemically synthesized.

As used herein, the term "silicates" refers to magnesium silicate, aluminum silicate, calcium silicate, potassium silicate, sodium silicate, lithium silicate, or other silicate compounds, or minerals including talcs, kaolins, shales and clays which may be incorporated into the cement products of the present disclosure.

As used herein, the term "thermostable protein" or "thermostable" refers to a bacteria, protein or protein fragment that resists irreversible changes in its structure due applied heat. Typically, a protein, or fragment thereof, is "thermostable" when it exhibits the same observable characteristics, e.g., solubility, function/activity, etc., at elevated temperatures, i.e., from about 50° C. to 80° C.

BKH1 and Bioremediase

In some embodiments, the concrete composition includes a *Thermoanaerobacter* sp. bacteria that has biomineralization and/or biosilification activity. In one embodiment, the bacteria is BKH1. BKH1 can be isolated from its native environment and identified though morphological characterization, its 16S RNA sequence (SEQ ID NO: 2, see below), and/or its functional activity, i.e., biosilification and biomineralization activity.

(SEQ ID NO: 2)
```
GGTAAGCACG GAGTTGAGTG CCGGATAGCG GCGGACGGGG TGAGTAAACG CGTGGGCAAA

CCTACCCTTA AGACCGGGGA TAACACCTCG AAAGGGGTGC TAATACTGGA TAAGCTCCTT

GTAGGGCATC CTATGAGGAG GGAAGGTAGC GGAAGCTACC GCTTAAGGAT GGGCCCGCGT

CCCATCAGCT AGTTGGTAGG GTAACGGCCT ACCAAGGCGA CGACGGGTAG CCGGCCTGAG

AGGGTGGTGG GCCACACTGG GACTGAGACA CGGCCCAGAC TCCTACGGGA GGCAGCAGTG

GGGAATCTTG CGCAATGGGC GAAAGCCTGA CGCAGCGACG CCGCGTGAGC GAAGAAGGCC

TTCGGGTCGT AAAGCTCGAT AGTGTGGGAA GAATAGATGA CGGTACCACA CGAAAGCCCC

GGCTAACTAC GTGCCAGCAG CCGCGGTAAG ACGTAGGGGG CGAGCGTTGT CCGGAATTAC

TGGGCGTAAA GGGCGCGTAG GCGGCCACTT AAGTCAGGTG TAAAAAACCC GGGCTCAACC

CGGGGGATGC ACATGAAACT GGGTGGCTAG AGGGGAGGAG AGGGGAGTGG AATTCCCGGT

GTAGCGGTGA AATGCGTAGA TATCGGGAGG AATACCAGTG GCGAAGGCGA CTCTCTGGAC

TGACCCTGAC GCTGAGGCGC GAAAGCGTGG GGAGCAA.
```

BKH1 cells may be grown under anaerobic culture conditions, in minimal growth medium. BKH1 cells may also be grown at elevated temperatures. In one embodiment, BKH1 cells are grown at about 20° C., 30° C., 35° C., 40° C., 45° C., 50° C., 55° C., 60° C., 65° C., 70° C., 75° C., 80° C., 85° C., or 90° C., to about 95° C. In one embodiment, BKH1 cells are grown at about 45° C., 50° C., 55° C., 60° C., 65° C., or 70° C. to about 75° C. In one embodiment, BKH1 cells are grown from a pH of about 5, 6, 7, 8, 9, or 10 to about pH 12.5. In one embodiment, BKH1 cells are grown at about a pH of about 8.

In one aspect, BKH1 produces an endogenous protein that has silica releasing activity, i.e., biosilification activity. In one embodiment, the endogenous protein is a secretory protein that has biosilification activity. Accordingly, BKH1 has biosilification activity through its production of a biosilification protein. The amount of silica released by BKH1 in a biosilification reaction is related to the amount of biosilification protein that is produced. For instance, an increase in the amount of biosilification protein correlates with an increase in the amount of silica released by BKH1 in a biosilification reaction. Accordingly, an increase in BKH1 cell concentration is related to an increase in the amount of silica.

In one embodiment, the BKH1 has biosilification activity of at least about 60, 65, 70, 75, 80, 85, 90, or 95 to about 100 µg silica/mg protein. In one embodiment, the BKH1 has biosilification activity of at least about 200, 210, 220, 230, 240, 250, 260, 270, 280, or 290 to about 300 µg silica/mg protein. In one embodiment, BKH1 has biosilification activity of at least about 400, 410, 420, 430, or 440 to about 450 or more µg silica/mg protein.

In one aspect, the present disclosure provides methods for purifying bioremediase from BKH1. For example, BKH1 cells are cultured using conditions that allow for cell growth. In one embodiment, growth medium containing a suitable density of BKH1 cells is collected and lyophilized. The lyophilized growth medium is dissolved in a solvent, thereby forming a solution. The solution is then contacted with a second solution, i.e., acetone, to generate a precipitate. The precipitate is then contacted with a second solvent, thereby forming a second solution, wherein the second solution is equilibrated. In one embodiment, the second solution is subjected to various chromatographic techniques known in the art, e.g., size exclusion, ion exchange, affinity, etc., to isolate bioremediase.

Protein precipitation can be performed at room temperature or at decreased temperature, e.g., about 4° C., as long as the protein precipitates from solution. Various precipitation methods and reagents may be employed, e.g., acetone, ammonium sulfate, or other methods of "salting out" a protein, isoelectric point precipitation, organic solvent precipitation (MeOH, EtOH, etc.), flocculation by polyelectrolytes; polyvalent metal ion precipitation; and non-ionic hydrophilic polymers (dextrans, PEGs, etc.). Similar methods, steps, and reagents are recognizable by those of skill in the art for each of the foregoing procedures. In one embodiment, purification methods include HPLC and/or FPLC chromatographic techniques. Size-exclusion and/or affinity-based column resins may be employed when using HPLC or FPLC. See, e.g., Sambrook, et at. 1989.

Bioremediase is a protein with an approximately molecular weight of about 28 kDa, as measured based on its migration on a 12% SDS-polyacrylamide gel. In one embodiment, the N-terminus of purified bioremediase is identified by the sequence of DFPIANGERQSPVDIDTKAVVQDPA (SEQ ID NO.: 1).

In one embodiment, the amount of silica released by bioremediase, or active fragment thereof, in a biosilification reaction, is related to the concentration of bioremediase. An increase in the amount of bioremediase, or active fragment thereof, correlates with an increase in the amount of silica released in a biosilification reaction. In one embodiment, bioremediase, or an active fragment thereof, has biosilification activity of at least about 60, 65, 70, 75, 80, 85, 90, or 95 to about 100 µg silica/mg protein. In one embodiment, bioremediase, or an active fragment thereof, has biosilification activity of at least about 200, 210, 220, 230, 240, 250, 260, 270, 280, or 290 to about 300 µg silica/mg protein. In one embodiment, bioremediase, or an active fragment thereof, has biosilification activity of at least about 400, 410, 420, 430, or 440 to about 450 or more µg silica/mg protein.

In one embodiment, active fragments of the bioremediase protein are capable of functioning as the full length protein. An amino acid sequence containing less than full length bioremediase sequence, i.e., a fragment, is provided for herein. In one embodiment, a fragment can result from a truncation at the amino terminus, a truncation at the carboxy terminus, and/or an internal deletion of one or more amino acid residues from the bioremediase amino acid sequence.

Naturally occurring bioremediase fragments may result from alternative RNA splicing, in vivo processing such as the removal of the leader peptide or propeptide, and/or from proteolytic degradation. In some embodiments, the bioremediase amino acid fragment may be at least about 50, 100, or 150 amino acids in length.

Bioconcrete Production

In one aspect, the present disclosure relates to a concrete composition including a cement matrix and a suitable amount of BKH1 and/or bioremediase. In one embodiment, the cement matrix contains magnesium silicate. In one embodiment, the cement matrix is produced from constituents including $MgSiO_3$. In one embodiment, when BKH1 and/or bioremediase is incorporated into a concrete composition, the composition has increased compressive strength, flexural strength, tensile strength, hardness, dynamic elastic-modulus, long-term durability, and/or compactness when compared to compositions lacking one or both of BKH1 and bioremediase.

In one embodiment, when BKH1 and/or bioremediase is incorporated into a concrete composition, the composition has a reduced permeability, a modified porosity structure, and/or a modified matrix micro-structural when compared to compositions lacking one or both of BKH1 and bioremediase. Accordingly, when BKH1 and/or bioremediase are incorporated into a concrete composition, the durability of the structure is improved when compared to compositions lacking one or both of BKH1 and bioremediase. In one embodiment, the concrete composition described herein can effectively repairs cracks and can be utilized as a self-healing concrete.

In one embodiment, the concrete composition contains a cement matrix. The cement matrix includes any hydraulic cement such as, for example, mortar, Ordinary Portland Cement (OPC), blended Portland cement (e.g. Portland blast-furnace cement, Portland flyash cement, Portland pozzolan cement, Portland silica fume cement, etc.), masonry cement, expansive cement, rapid setting and hardening cement, calcium aluminate cement, calcium sulfoaluminate cement, pozzolan-lime cement, slag-lime cement, supersulfated cement, natural cement, geopolymer cement, magnesium-based cement, magnesium phosphate cement, magnesium silicate ($MgSiO_3$) cement, other magnesium and/or silica cements, and any mixtures and combinations thereof. In one embodiment, the cement matrix comprises Portland cement or blended Portland cement.

A cement matrix may include any magnesium-based hydraulic cement such as, for example, magnesium-based mortar, magnesium-based masonry cement, magnesium-based expansive cement, magnesium-based rapid setting and hardening cement, magnesium-based supersulfated cement, magnesium-based natural cement, magnesium-based geopolymer cement, magnesium phosphate cement, magnesium silicate ($MgSiO_3$) cement, other magnesium-based silica cements, and any mixtures and combinations thereof.

In one aspect, the silicate minerals, i.e., from $MgSiO_3$, impart strength to the magnesium cement, and at higher concentrations allow the cement to be vigorously manipulated, i.e., drilled. In one embodiment, the silicate minerals also react with weakly bound (or free) chloride ions in the cement, thereby forming silicic acid and thus improving the strength of the magnesium-based cement. In one embodiment, addition of phosphate and fluoride minerals form stronger and more permanent cements by react with free chloride or hydroxy groups.

In one embodiment, $MgSiO_3$ is present in magnesium-based cement at about 0.1, 0.5, 1, 2, 3, 4, 5, 6, 7, 8, 9, 10, 15, 20, 25, 30, 35, 40, 50 or 80% (w/w). In one embodiment, one or more magnesium compounds are present in magnesium-based cement at about 0.1, 0.5, 1, 2, 3, 4, 5, 6, 7, 8, 9, 10, 15, 20, 25, 30, 35, 40, 50 or 80% (w/w). In one embodiment, one or more silicate minerals or compounds are present in magnesium-based cement at about 0.1, 0.5, 1, 2, 3, 4, 5, 6, 7, 8, 9, 10, 15, 20, 25, 30, 35, 40, 50 or 80% (w/w).

In one embodiment, the BKH1 and/or bioremediase in the cement allows for the cement to have increased compressive strength, flexural strength, tensile strength, hardness, dynamic elastic-modulus, and compactness. In one embodiment, when BKH1 and/or bioremediase is incorporated into a cement, the resulting composition has a reduced permeability, a modified porosity structure, and a modified matrix micro-structural. Accordingly, when BKH1 and/or bioremediase is incorporated into a cement, the durability of the cement is improved. In one embodiment, the cement containing BKH1 and/or bioremediase can be used as a self-healing concrete. In one embodiment, a self-healing concrete has the capability of repairing cracks or other structural damage without the need for human intervention. See, e.g., Biswas et al., (2010). In one embodiment, the cement containing BKH1 and/or bioremediase absorbs $CO_2$. In one embodiment, the cement containing BKH1 and/or bioremediase has a net carbon-negative effect on the environment, i.e., en toto, when producing a concrete that includes a cement, more carbon is absorbed than emitted during the process. All of the above parameters can be measured relative to a cement lacking BKH1 and/or bioremediase.

In one aspect, the present technology contemplates concrete compositions which include effective amounts of BKH1 and/or bioremediase. In one embodiment, the tensile strength of the bioconcrete is increased relative to a similar concrete composition that does not have BKH1 and/or bioremediase. In one embodiment, it is contemplated that the concrete compositions include an amount of BKH1 and/or bioremediase that allows for an increase in the compressive or tensile strength of the concrete composition by at least about 5%, 10%, 15%, 25%, 30%, 35%, 40%, 50%, 60%, 70%, 80%, 90% or 100%, compared to the strength of the concrete composition in the absence of one or both of BKH1 and/or bioremediase. In one embodiment, the increased compressive strength is at least about a 1, 2, 3, 4, 5, 6, 7, 8, 9, 10, 15, 20, 25, 30, 35, 40, 45, 50, 100, 200, 300, or 500% increase relative to a similar concrete composition that does not have BKH1 and/or bioremediase. In one embodiment, the increased compressive strength is at least about a 10, 15, 20, 25, 30, 35 or 40% increase relative to a similar concrete composition that does not have BKH1 and/or bioremediase.

Numerous methods for measuring concrete or cement strength are known in the art. For example, the compressive or tensile strength of concrete compositions, and properties related thereto, can be measured by, but are not limited to, pulsed nuclear magnetic resonance, the fracture test, the soil direct shear test, the slump test, the Kango hammer test, and the intensive compaction test, etc. See, e.g., Wig, R. J., *Comparative Tests of the Strength of Concrete in the Laboratory and the Field. Proceedings of the National Association of Cement Users*, p. 522-525 (1912). In one embodiment, a micro-bench device is employed to measure the compressive and/or tensile strengths of the bioconcrete. See, e.g., Biswas et al., (2010).

In one embodiment, at least about $5\times10^3$, $1\times10^4$, $5\times10^4$, $1\times10^5$, $5\times10^5$, or $1\times10^6$ BKH1 cells/mL are included in the cement or the concrete composition. In one embodiment, at least about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 μg bioremediase/g of cement is included in the cement or the concrete composition.

In one embodiment, the cement or concrete compositions include additional components commonly found in various concretes, such as, fine and/or coarse aggregates (e.g., gravel, sand, granite, limestone, etc.) and/or additional binders. Aggregate components can be added amounts in suitable weight ratios for concrete compositions, e.g., a weight ratio of about 2.0 relative to the amount of cement binder.

In one embodiment, the cement or concrete compositions include a viscosity agent. Suitable viscosity agents can be chosen by a skilled artisan. Viscosity agents include, but are not limited to, methylcellulose, polyvinyl alcohol, starch, and combinations or mixtures thereof. The amount of viscosity agent added to the concrete composition can vary, e.g., a weight ratio of about 0.01 to 10 relative to the amount of cement binder.

In one embodiment, the cement or concrete compositions include cement extenders, i.e., pozzolans. Pozzolans include, but are not limited to, fly ash, metakaolin, ground granulated blast furnace slag, and silica fume, or any combination thereof.

In one embodiment, the cement or concrete compositions include additional components such as, but not limited to: reinforcing fibers (e.g., aramid, polyvinyl alcohol, high modulus polyethylene, and high tenacity polypropylene fibers); plasticizers; chemical agents that aid concrete flow; chemical agents that aid concrete pumping; chemical agents that delay concrete setting; chemical agents that quicken concrete setting; and other components that are found in concrete compositions.

In one embodiment, cement and/or concrete compositions can be prepared according to any method that is commonly used in the art. Individual components of the compositions can be packaged separately and mixed (either sequentially or simultaneously). In one embodiment, the components can be packaged together in premeasured amounts. In one embodiment, BKH1 and/or bioremediase are packaged together with the cement matrix in dry form. In one embodiment, BKH1 and/or bioremediase are included in a liquid stock premixed package of concrete.

EXAMPLES

The present compositions and methods will be understood more readily by reference to the following examples, which are provided by way of illustration and are not intended to be limiting in any way.

Example 1

Isolation and Analysis of BKH1

Bacterial isolation. Using 100 ml capacity sealed gas-pressure vials, 40 ml of enrichment growth medium (0.1M Fe(OH)$_3$, 0.6 g/L Na$_2$HPO$_4$, 0.33 g/L KCl, 2.5 g/L Na$_2$CO$_3$, 0.02% yeast extract and 0.5% peptone, pH 7) was deoxygenated by carbon dioxide as previously described. See Chattopadhyay B. D., et al., *Effect of calcium ion on Methanosarcine barkeri MS. Ind J Expt Biol.*, Vol. 31 738-742 (1993). Inoculums from crude soil sample were added to the growth media and incubated at 65° C. for several days. A mixed population of culture containing various bacteria was produced through subsequent subcultures. A *Bacillus* sp enrichment culture was subsequently obtained through subculturing at 65° C. and a pH of 7. Pure cultures of a bacterial strain were obtained by serial dilution of the enrichment culture containing the bacteria.

Figure 1A:
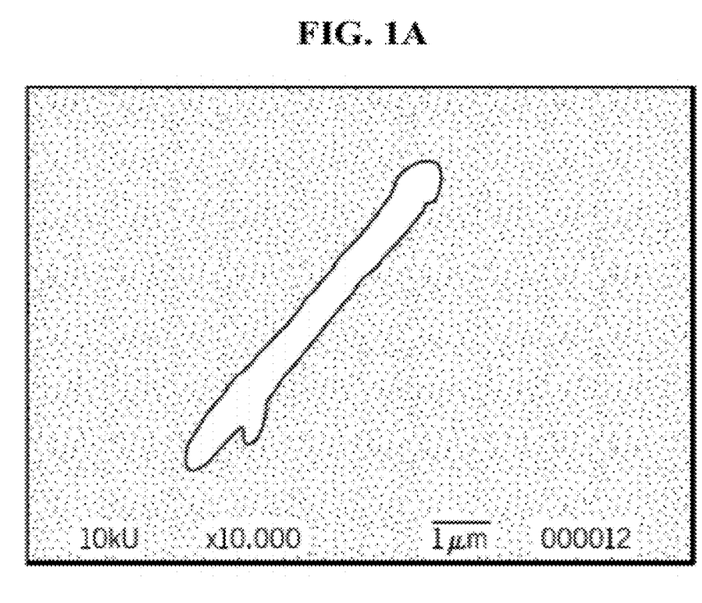

Following isolation of the bacteria, BKH1 was analyzed using a scanning electron micrograph (SEM) as shown in FIG. 1A. BKH1 cells were fixed with 2.5% (v/v) gluteraldehyde in culture medium for about 24 h at room temperature. Samples were subsequently dehydrated using acetone and air-dried. SEM alumina supports with gold were employed in addition to a coater of Blazers (Type 07120-A). FIG. 1A is a SEM image at 10,000×.

Figure 1B:
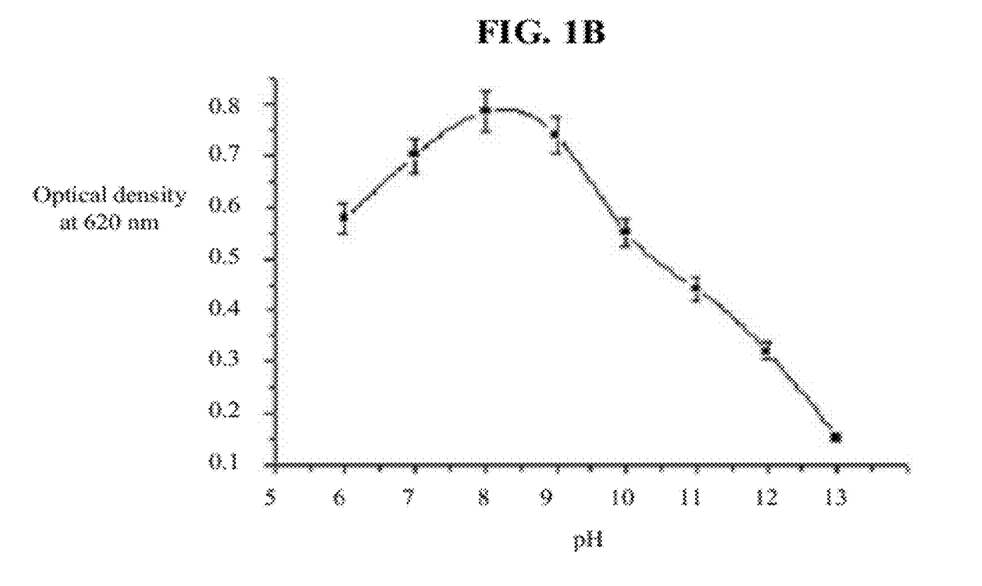
FIG. 1B is a graph showing BKH1 growth at increasing pH.
Figure 1C:
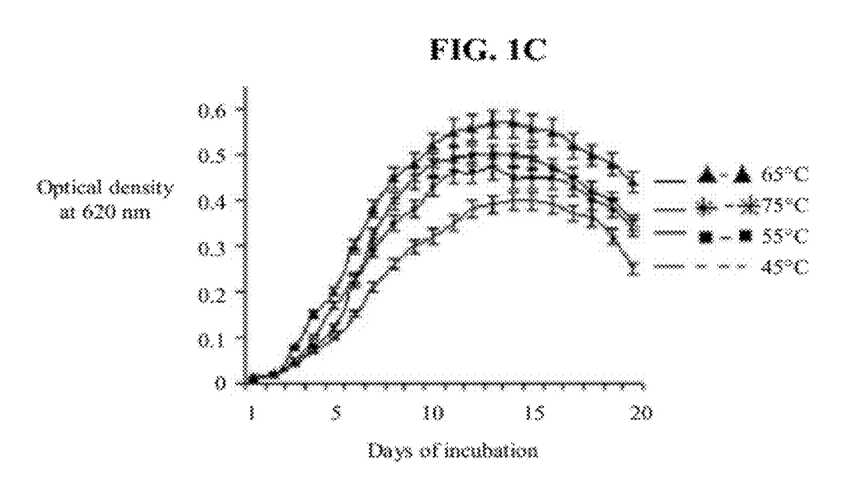
FIG. 1C is a graph showing BKH1 growth at increasing temperatures.

As shown in FIG. 1B, BKH1 cell growth was determined at 65° C. with varying pH (6-13). Growth medium was prepared and inoculated with a BKH1 bacterial culture. The bacterial cultures were grown for 10 days and the optical density was measured at 620 nm. As shown in FIG. 1C, BKH1 cell growth was determined at pH 8 with varying temperatures (45, 55, 65, and 75° C.). Growth medium was prepared and inoculated with a BKH1 bacterial culture. The bacterial cultures were grown for 10 days and the optical density was measured at 620 nm.

Example 2

Purification and Characterization of Bioremediase

Figure 2:
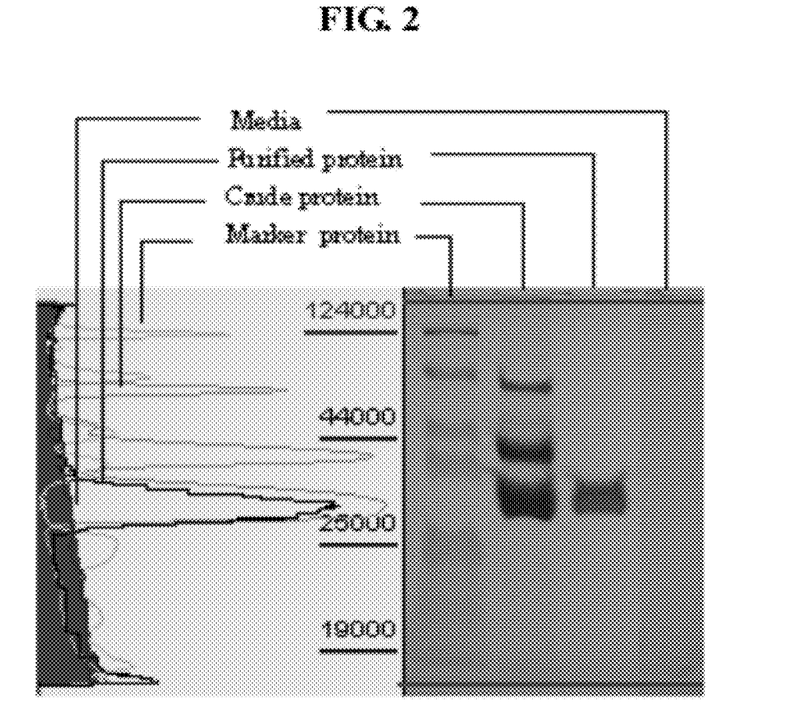
FIG. 2 shows a SDS-PAGE gel of a representative bioremediase protein and associated protein peaks. In lane 1, molecular weight (mw) standards are shown. In lane 2, growth medium supernatant is shown. Lane 3 shows the representative purified bioremediase protein.

Bacterial cells (100 ml) were cultured for 8-10 days, harvested, and centrifuged. The supernatant was removed and lyophilized (freeze dryer FD-1, Rikakikai, Toshiba). The lyophilized powder (20 mg) was dissolved in 1 ml of sterile, deionized water. Ice-cold acetone (2 ml) was added to the dissolved lyophilized solution, and stored at 4° C. for 2 hours (h). Proteins were precipitated and separated from the soluble fraction by centrifugation at 4° C. for 15 min at 10,000×G (Plasto Craft Super spin R-V/FM). The protein precipitate was washed in 1 ml ice-cold acetone, and centrifuged again. After removing the liquid phase and drying, the precipitated protein was dissolved in 250 μl deionized sterile water and applied to a 100 cm×1 cm Sephadex G-100 column in 5 mM Tris-Cl buffer (pH 6.8). After allowing the solution to pass over the column by gravity flow, 1 ml fractions were collected. The presence of protein was detected by using a spectrometer at 280 nm (FIG. 2).

The fractions containing protein were subsequently assayed for biosilicification activity using a silica-rich substrate, e.g., tetraethoxyorthosilicate (TEOS). Fractions that demonstrated biosilicification activity were pooled, passed over a Sephadex G-100 column, again, and concentrated to 250 μl. The molecular weight (kDa) and purification of the protein was evaluated using 12% SDS-PAGE (FIG. 2). Bioremediase characteristics at various stages of the purification process are detailed in Table 1. As shown in Table 1, specific activity was measured where one unit equates to silica release (μg)/protein (mg).

TABLE 1

Bioremediase Purification and Biosilicification of Crude Protein Fractions

| Sample | Total Protein (mg) | Sp. Activity (unit/mg)† | Protein Recovery (%) | Fold Purification |
|---|---|---|---|---|
| Crude Extract media | 2.9 | 65.4 | 100 | 1 |
| Acetone Precipitation | 1.14 | 75.6 | 39 | 1.2 |
| Sephadex G-100 (1) | 0.43 | 217.6 | 14.7 | 3.3 |
| Sephadex G-100 (2) | 0.27 | 436.2 | 9.3 | 6.7 |

Samples containing the purified protein (100 µg) were subsequently digested at 37° C. for 20 h with 2 pmol endoproteinase Asp-N (Takara Bio, Shiga, Japan). The digested protein was separated by size using SDS-PAGE and transferred to a PVDF membrane. A 28 kDa fragment was excised from the gel and the 25 N-terminal amino acids (SEQ ID NO.: 1) were sequenced using the Edman Degradation method (UniProt Knowledge accession number P86277).

Example 3

Biosilicification Activity of Purified Bioremediase

Figure 3:
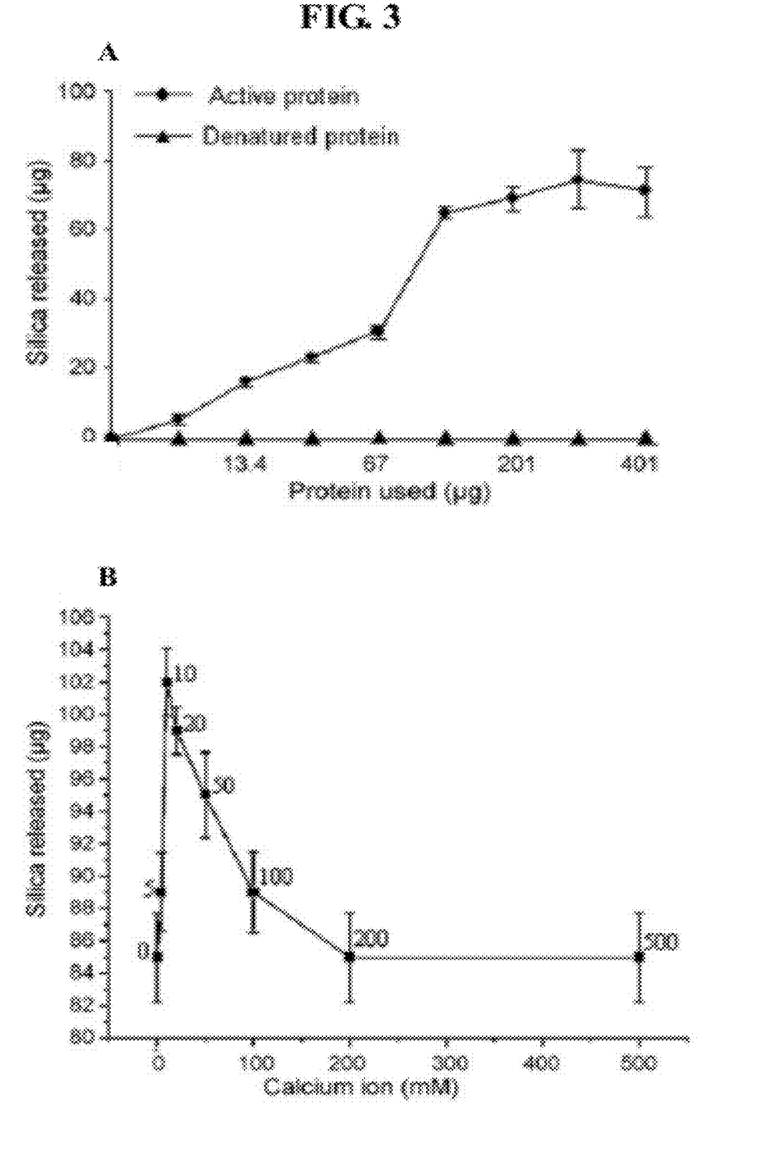
FIG. 3A shows the results from biosilification assays using the purified representative bioremediase protein.
FIG. 3B shows the silica releasing activity of the representative bioremediase as a function of salt concentration.

Purified bioremediase (20-400 µg of protein) was added to a test tube containing 20 mM Tris-HCl (pH 8) and 4.5 µM TOES at a final volume of 1 ml. The reaction was performed at 65° C. for 180 min and terminated by centrifugation at 15,000×G for 20 min. The pellet was resuspended in 1 M NaOH and the silicic acid was quantified using the molybdate assay as described. See, Douglas, H. A., et al., *Poly. Mater. Sci. & Engg.*, Vol., 90: 239-241 (2004). Briefly, 5 N $HNO_3$, (200 µl) and 500 µl ammonium molybdate were added to the resuspended pellet and a 10% metol (N-methyl-p-aminophenol) solution (v/v) was added to the reaction mixture. A silicic acid calibration curve was calculated by measuring absorbance at 405 nm. The absolute amounts of silicic acid were calculated from a silicon standard calibration curve (Merck, Whitehouse Station, N.J.). The reaction was standardized for substrate concentration, pH, and temperature (FIG. 3A). Salt tolerance activity of the protein was determined in presence of $Ca^{2+}$, $Mg^{2+}$ and $Al^{3+}$ (FIG. 3B).

Example 4

Bioremediase Biosilicification using $MgSiO_3$ as a Substrate

Purified bioremediase (200 µg of protein) was added to a test tube containing 20 mM Tris-HCl (pH 8) and 0.02 µg $MgSiO_3$ at a final volume of 1 ml. The reaction was performed at 65° C. for 180 min and terminated by centrifugation at 15,000×G for 20 min. The pellet was resuspended in 1 M NaOH and the silicic acid was quantified using the molybdate assay as described. See, Douglas, H. A., et al., *Poly. Mater. Sci. & Engg.*, Vol., 90: 239-241 (2004). Briefly, 5 N $HNO_3$, (200 µl) and 500 µl ammonium molybdate were added to the resuspended pellet and a 10% metol (N-methyl-p-aminophenol) solution (v/v) was added to the reaction mixture. A silicic acid calibration curve was calculated by measuring absorbance at 405 nm. The absolute amounts of silicic acid were calculated from a silicon standard calibration curve (Merck, Whitehouse Station, N.J.). The reaction was standardized for substrate concentration, pH, and temperature (Table 2). As shown in Table 2, when reacting with a $MgSiO_3$ substrate, bioremediase has a specific activity of 241 (µg silica/mg protein). Other substrates were also tested as shown (Table 2).

TABLE 2

| Bioremediase biosilification activity | | | |
| --- | --- | --- | --- |
| Protein used (µg) | Substrate used | Optical density ± SD | Silica leach (µg)/mg protein |
| 135 | TEOS (4.5 µM) | 0.66 ± 0.17 | 430 |
| 200 | Cement (1 g) | 0.20 ± 0.04 | 145 |
| 200 | Mortar sample (5 g) | 0.11 ± 0.01 | 75 |

TABLE 2-continued

| Bioremediase biosilification activity | | | |
| --- | --- | --- | --- |
| Protein used (µg) | Substrate used | Optical density ± SD | Silica leach (µg)/mg protein |
| 200 | Magnesium silicate (0.02 µg) | 0.37 ± 0.07 | 241 |

Example 5

Compressive Strength of BKH1 Magnesium-Based Mortar

Standard mortar cubes (70.6×70.6×70.6 $mm^3$) are prepared by mixing increasing BKH1 concentrations (0, $10^4$, $10^5$ and $10^6$ cells/ml $H_2O$) with a cement-sand mixture. OPC (43 grade) and standard Ennor sand (well-graded coarse aggregate, 10 mm maximum size) are used for sample preparation. The cement-to-sand ratio can be 1:3 and the water-to-cement ratio is fixed at 0.4:1 for all mortar samples. For mortar preparation, distilled water is used. Sand and cement is thoroughly mixed with distilled water containing a suitable BKH1 cell concentration. Cubes are cast and compacted using a vibration machine, and subsequent to formation, the cubes are cured for 28 days in distilled water at room temperature.

After curing, samples are analyzed for their compressive strength using the 2000 K Newton compression testing machine. It is expected that the addition of increasing concentrations of BKH1 and/or bioremediase can increase the compressive strength of magnesium-based mortar relative to control samples. Mortar samples are also tested using a Pundit Plus Ultrasonic pulse velocity meter (PC 1007) ASTM C597-02. Accordingly, the dynamic modulus of elasticity can be determined and an average value over all samples is calculated.

Example 6

Compressive Strength of Magnesium-Based Mortar and Cement Containing Bioremediase Cement paste blocks are prepared in the presence or absence of native or denatured bioremediase at increasing concentrations 0.1-2.0 µg/g (protein/cement) and a 1:2.5 ratio of water to cement. After 7, 14, 28, or 60 days of water curing, the blocks are cut into cubes (10×10×10 $mm^3$). Compressive strengths are determined using a manual pressure bench.

Mortar bars are also prepared in the presence or absence of native or denatured bioremediase at increasing concentrations. A 1:2 water to cement weight ratio, and a 1:3 cement-sand weight ratio are employed. Three different grain-size sand particles (125-250 µm; 250-500 µm; and 500-1000 µm), at 1:1:1 ratios, are used in mortar sample preparation. Bioremediase is mixed with the cement using 1:1 to 1:10 µg/g (protein vs. cement) ratios. After 7, 14, 28, or 60 days of water curing, the blocks are cut into cubes (7×7×7 $mm^3$). Compressive strengths are measured using a Micro bench device.

Example 7

Microscopic Analysis of Magnesium-Based Cement Containing Bioremediase

Cement-protein compositions are analyzed using environmental scanning electron microscope (ESEM) imaging.

ESEM allows for partial volume analysis of, e.g., pore, calcium hydrate silicate, and non-hydrated cement. Cement-protein compositions can also be analyzed for e-modulus and hardness.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 proteins refers to groups having 1, 2, or 3 proteins. Similarly, a group having 1-5 proteins refers to groups having 1, 2, 3, 4, or 5 proteins, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All references cited herein are incorporated by reference herein in their entireties and for all purposes to the same extent as if each individual publication, patent, or patent application was specifically and individually incorporated by reference in its entirety for all purposes.

What is claimed is:

1. A concrete composition comprising:
   one or more bacteria or proteins capable of catalyzing a biosilification reaction; and
   one or more magnesium silicate compounds.

2. The concrete composition of claim 1, further comprising one or more additional silicate compounds.

3. The concrete composition of claim 2, wherein the one or more additional silicate compounds is selected from the group consisting of calcium silicates, aluminum silicates, potassium silicates, sodium silicates, and lithium silicates, and combinations thereof.

4. The concrete composition of claim 1, wherein the concrete comprises materials selected from the group consisting of cementitious materials, sand, and gravel and combinations thereof.

5. The concrete composition from claim 1, wherein the one or more bacteria are added to the concrete in an amount from about $10^1$ and about $10^9$ cells/vol of water used in concrete.

6. The concrete composition from claim 1, wherein the one or more proteins are added to the concrete in an amount from about 0.1 to about 3 μg protein/g cement.

7. The concrete composition of claim 1, wherein the one or more magnesium silicate compounds is $MgSiO_3$ or soft-burned $MgSiO_3$.

8. The concrete composition of claim 1, wherein the one or more bacteria is a *Thermoanaerobacter* sp. anaerobic bacterial strain which produces an enzyme capable of catalyzing a biosilification reaction.

9. The concrete composition of claim 1, wherein the one or more proteins has a region of contiguous amino acids having at least 90% sequence identity to SEQ ID NO.: 1.

10. The concrete composition of claim 4, wherein the one or more cementitious materials comprises components selected from the group consisting of cement powder, fine aggregates, coarse aggregates and combinations thereof.

11. The concrete composition of claim 1, wherein the composition has increased compressive, flexural, and/or tensile strength compared to the composition without the one or more bacteria or proteins, wherein the increased compressive, flexural, and/or tensile strength is at least about a 20% increase.

12. The concrete composition of claim 1, wherein the composition has a decreased water absorption from about 5% to about 10% compared to the composition without the one or more bacteria or proteins.

13. The concrete composition of claim 1, further comprising one or more ingredients selected from the group consisting of reducing agents, fluidizing agents, rust-proofing agents, hardening agents, hardening-accelerator agents, setting retarders, inflating agents, fly ash, slag, silica fume, rice husk ash, and clinkers.

14. A method for producing biomineralized concrete comprising:
   combining one or more cementitious materials, one or more bacteria or proteins capable of catalyzing a biosilification reaction, and one or more magnesium silicate compounds, into a mixture; and
   allowing the mixture to cure into a solid product.

15. The method of claim 14, wherein the product is formed by air curing or water curing or a combination of both.

16. The method of claim 15, wherein the air curing or the water curing occur for about 1-60 days.

17. The method of claim 14, wherein the combining occurs at a pH from about 4 to about 12.

18. The method of claim 14, further comprising adding one or more additional silicate compounds to the mixture, wherein the additional silicate compounds are selected from the group consisting of calcium silicates, aluminum silicates, potassium silicates, sodium silicates, and lithium silicates and combinations thereof.

19. The method of claim 14, wherein the one or more magnesium silicate compounds is $MgSiO_3$ or soft-burned $MgSiO_3$.

20. The method of claim 14, wherein the one or more bacteria is a *Thermoanaerobacter* sp. anaerobic bacterial strain which produces an enzyme capable of catalyzing a biosilification reaction.

* * * * *

UNITED STATES PATENT AND TRADEMARK OFFICE
CERTIFICATE OF CORRECTION

PATENT NO. : 8,518,177 B2  
APPLICATION NO. : 12/962174  
DATED : August 27, 2013  
INVENTOR(S) : Chattopadhyay et al.

It is certified that error appears in the above-identified patent and that said Letters Patent is hereby corrected as shown below:

On Title Page 2, in Item (56), under "OTHER PUBLICATIONS", in Column 1, Line 20, delete "Atschul," and insert -- Altschul, --, therefor.

On Title Page 2, in Item (56), under "OTHER PUBLICATIONS", in Column 1, Line 42, delete "hitp://" and insert -- http:// --, therefor.

On Title Page 2, in Item (56), under "OTHER PUBLICATIONS", in Column 1, Line 57, delete "Dayhoff.," and insert -- Dayhoff, --, therefor.

In the Specification

In Column 5, Line 50, delete "blastfumace" and insert -- blastfurnace --, therefor.

In Column 8, Line 37, delete "et at." and insert -- et al., --, therefor.

In Column 12, Lines 6-7, delete "gluteraldehyde" and insert -- glutaraldehyde --, therefor.

In the Claims

In Column 17, Line 28, in Claim 5, delete "from" and insert -- of --, therefor.

In Column 17, Line 31, in Claim 6, delete "from" and insert -- of --, therefor.

Signed and Sealed this  
Seventeenth Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

PATENT NO.       : 8,518,177 B2
APPLICATION NO.  : 12/962174
DATED            : August 27, 2013
INVENTOR(S)      : Brajadulal Chattopadhyay et al.

It is certified that error appears in the above-identified patent and that said Letters Patent is hereby corrected as shown below:

In The Specification:

In Column 3, Line 55, delete "calcium hydrate silicate" and insert -- calcium silicate hydrate --, therefor.

In Column 5, Line 50, delete "flyash" and insert -- fly ash --, therefor.

In Column 9, Line 35, delete "flyash" and insert -- fly ash --, therefor.

Signed and Sealed this
Fifth Day of May, 2015

Michelle K. Lee
*Director of the United States Patent and Trademark Office*